United States Patent [19]
Hackett

[11] 3,986,182
[45] Oct. 12, 1976

[54] MULTI-ZONE INTRUSION DETECTION SYSTEM

[75] Inventor: Kenneth R. Hackett, Boulder, Colo.

[73] Assignee: Sontrix, Inc., Boulder, Colo.

[22] Filed: Jan. 21, 1975

[21] Appl. No.: 542,695

Related U.S. Application Data

[63] Continuation-in-part of Ser. No. 455,260, March 27, 1974.

[52] U.S. Cl. ............................. 340/258 A; 340/15; 343/7.7
[51] Int. Cl.² ........................................ G08B 13/16
[58] Field of Search ................. 340/258 A, 225, 15; 343/7.7, 5 PD

[56] References Cited
UNITED STATES PATENTS

| | | | |
|---|---|---|---|
| 2,649,538 | 8/1953 | Marlowe et al. | 343/5 PD |
| 3,680,074 | 7/1972 | Lieser | 340/258 A |
| 3,691,558 | 9/1972 | Hoard et al. | 340/258 C |
| 3,736,584 | 5/1973 | Hackett et al. | 340/258 A |
| 3,781,859 | 12/1973 | Hermans | 340/258 A |
| 3,803,539 | 4/1974 | McMaster | 340/258 C |
| 3,938,118 | 2/1976 | Galvin et al. | 340/258 A |

*Primary Examiner*—Glen R. Swann, III
*Attorney, Agent, or Firm*—Charles E. Pfund

[57] ABSTRACT

An ultrasonic intrusion detection system having means for transmitting and receiving ultrasonic energy within a protected zone and generating an alarm when a moving object is present in the protected zone is supplemented to provide multiple independent response zones utilizing the same transmitter for all zones but individual receiver modules which can be added to the existing transmitter-receiver system to provide protection for additional independent zones with associated indicators for selectively indicating those zones which have been triggered by the presence of an intruder or other moving object.

5 Claims, 2 Drawing Figures

MULTI-ZONE INTRUSION DETECTION SYSTEM

CROSS-REFERENCE TO RELATED APPLICATION

This application is a continuation-in-part of applicant's copending application Ser. No. 455,260, filed on Mar. 27, 1974.

BACKGROUND OF THE INVENTION

Ultrasonic detection systems are well known for the protection of buildings, warehouses and other areas to provide an alarm signal or other notice when an intruder or other unauthorized object passes within the area protected by the system. In applicant's application, Ser. No. 455,260, a particular form of such system is disclosed which provides signal detection and noise immunity and other features which contribute to the overall reliability of detecting unauthorized entry into the protected zone. These prior systems can be arranged with multiple transducers to protect a larger area and can be duplicated to provide protection in adjacent or related areas. The cost of installation, calibratio, periodic checking of system sensitivity and routine maintenancce all, of course, increase in direct relation to the number of such systems which are installed.

SUMMARY OF THE PRESENT INVENTION

The present invention provides a multi-zone protection system with selective indication from each protected zone for an ultrasonic intrusion detection system which reduces the cost for the initial equipment for any given number of zones and permits modular expansion to protect additional zones utilizing the master control of the original ultrasonic detection system as the basic unit to which modules are added for increasing the number of independently protected zones. Thus a system of great flexibility and maximuum economy is provided with the ability to independently indicate responses from the various zones protected and interconnected to permit simple and reliable installation and independent calibration and test of the various zones.

Accordingly, it is the principal object of the present invention to provide a multi-zone ultrasonic intrusion detection system which is capable of modular expansion from a master control unit to include independently protected zones with selective indication of intrusion alarms from the respective zones.

A further object of the invention is to provide a multi-zone expansion system for intrusion detection which in addition to independent intrusion detection and indication provides for independent calibration, sensitivity adjustment and operability test procedures.

Further objects of the invention include the provision of a compact, reliable and simple modular intrusion detection system capable of expansion and which permits ease of manufacture and the utmost economy and reliability by duplicating only the receiver portion of the system in the various zones and interrelating the operation of all zones with respect to a master control and indicator unit.

IN THE DRAWINGS

DETAILED DESCRIPTION OF THE PREFERRED EMBODIMENT

Figure 1:
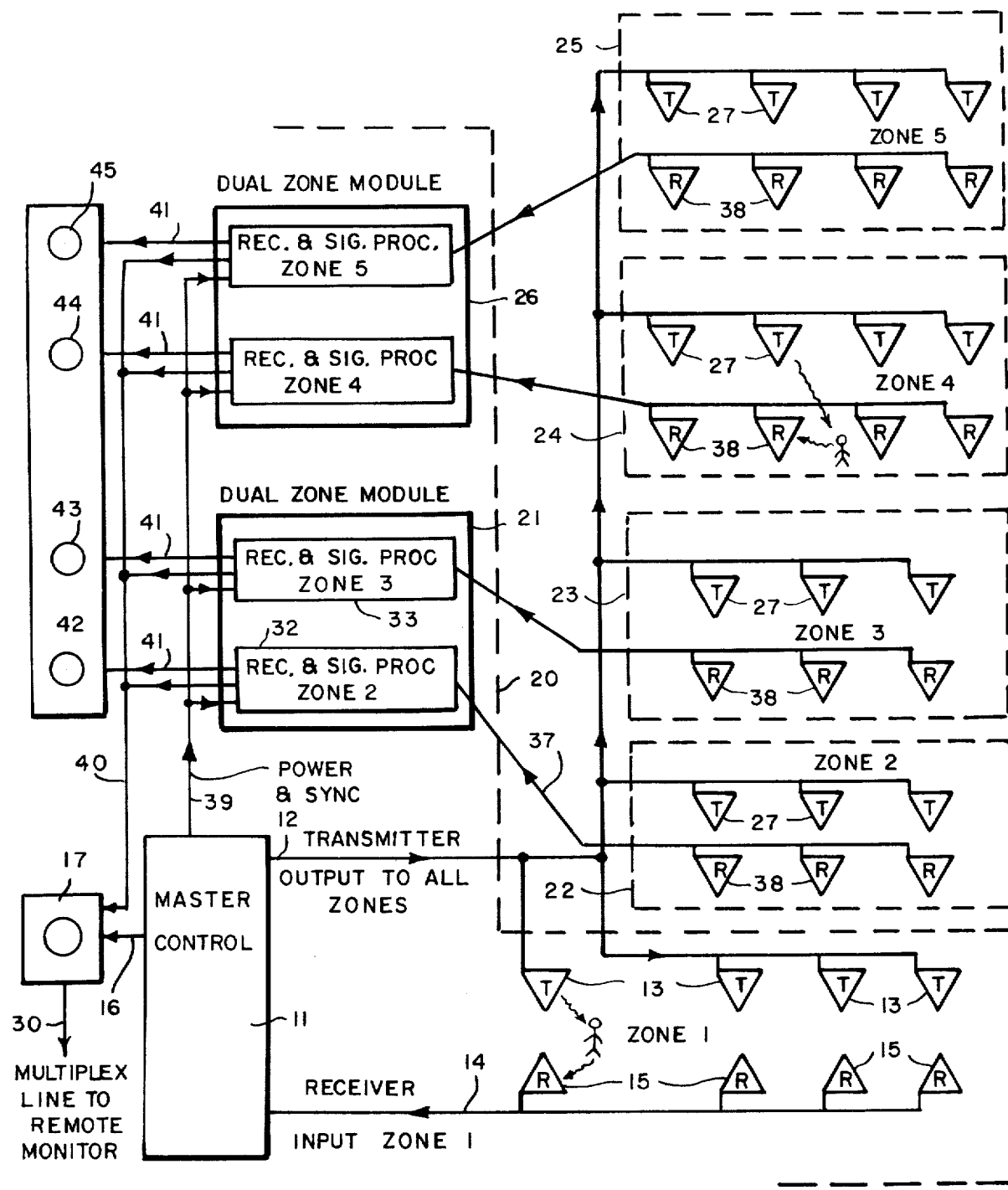
FIG. 1 is a block diagram of an overall multi-zone system in accordance with the present invention.

Referring now to FIG. 1 a multi-zone system is shown which includes a master control unit 11 which may be of known type and preferably is of the type disclosed in applicant's copending application Ser. No. 455,260. As therein disclosed, an ultrasonic oscillator which may be crystal controlled transmits ultrasonic wave energy into the protected zone by means of one or more transducers. In the present invention, the master control 11 provides an ultrasonicc wave generator having an output line 12 which is connected to drive one or more radiating transducers 13. The transducers 13 are spaced and located to provide an ultrasonic wave energy field in a given area, designated Zone 1 in FIG. 1, of sufficiently high energy level for ultrasonic detection purposes as is well understood in the art. Zone 1, in FIG. 1, is indicated by the dashed line 20 and normally includes the portion of the premises where the control unit 11 and associated indicators are located. A receiving line 14 is coupled to a plurality of receiving transducers 15 located and positioned in Zone 1 to provide in combination with transmitting transducers 13 zone coverage for the detection of intruders over the entire area to be protected in Zone 1. The transmitted signals on line 12 and the received signals on line 14 are combined in the receiver portion of masteer control 11 to extracct doppler information arising from the presence of a moving object within Zone 1. As previously stated this doppler signal detection system is preferably of the type disclosed in the aforementioned copending application.

Upon the detection of an intruder by the master control unit 11 an alarm or indication signal appears on line 16 to operate a local alarm indicator which may be of the audible or visual type associated with a multiplexing unit 17. The unit 17 may be coupled to a telephone line or other linkk for remote indication in a central station or remoate monitor via a multiplex line 30. Although the use of multiple transducers 13 and 15 in Zone 1 permits a wide area including relatively isolated portions thereof such as corridors and aisles to be protected, the system operating in Zone 1 from master control 11 is incapable of providing a selective indication in the indicator of unit 17 as to which portion of the zone has given rise to the signal indicating the presence of a moving intruder. Accordingly, when large areas are to be protected and surveillance or corrective measures need to be directed to the specific location of the intruder, further information is desired from the protection system. Such problems become more acute as multiple floors in multi-story buildings are being protected or where a central office surveillance team or other monitoring system has under surveillance the entire confines of a larger factory or multi-building manufacturing plant or the like. Obviously, the system for zone 1 with master control 11 could be duplicated for each area in which protection were required. Such duplication, however, is not only costly but involves duplication with respect to connections, calibration, monitoring and test and the possibility of interaction, all of which are obviated by the present invention.

Still referring to FIG. 1, the present invention is shown in conjunction with a known master control unit 11 with deployed transducers for the protection of zone 1 as providing modular expansion for additional zone coverage. Thus a dual zone module 21 can be added for the protection of zones 2 and 3 indicated in FIG. 1 as enclosed in dashed lines 22 and 23. The system can be further expanded by the addition of an additional dual zone module 26 which would provide protection for zones 4 and 5 designated as within the confines dashed lines 24 and 25. The modules 21 and 26 can for convenience be located in Zone 1 with the control unit 11.

Each of the additional zones 2–5 has deployed therein one or more transmitting transducers 27 each of which is coupled to be driven by energy from transmitter output line 12 from the master control 11. As in Zone 1, the transducers 27 in the additional zones are located and directed to provide an energy field within the respective zones adequate for ultrasonic intrusion detection. This energy is all supplied from the same ultrasonic generator in master control 11 which is designed to supply adequate ultrasonic power on line 12 to drive all of the transducers to be deployed in the multiple zone system. Since the power requirements for individual transducers is relatively small, a large number, such as 100 transmitting transducers 13 and 27, can be employed in the overall multi-zone system.

The dual-zone module 21 contains separate received signal processors 32,33, for the respective zones 22,23. Signal processor 32 receives signals on line 37 from Zone 2 derived from a plurality of receiving transducers 38 positioned and directed therein to obtain the desired coverage. The processor 32 derives operating power and a transmission frequency synchronous detection signal from the master control 11 to which it is coupled via line 39. An alarm output line 41 from the processor 32 is coupled to activate an individual alarm or indicator unit 42. An additional alarm output line 40 is connected to operate the main alarm and any other equipment associated with multiplex unit 17.

The indicator 42 is separate and distinct from the indicator in unit 17 and, for the system thus far described, selective indication of an intruder present in either Zone 1 or Zone 2 is provided by the indication from unit 17 along for Zone 1 and the indication on both unit 17 and indicator 42 for an intruder detected in Zone 2. Thus unit 17 provides the primary indication of an intrusion event in any zone and can be arranged for local and remote or central station monitoring via telephone line other communication link.

In similar manner, indicators 43, 44 and 45 are coupled to respective output lines 41 of the received signal processors 33, 34 and 35. Thus separate indications are given on the indicators 42–45 for the detection of a moving intruder in Zones 2, 3, 4 and 5. In each zone the deployment of the transmitting transducers 27 and the receiving transducers 38 can be arranged to cover the zone and any desired number of transmitting transducers up to the power output capabilities of the ultrasonic generator in master control 11 can be employed. For each zone the receiver and signal processor unit in the dual zone modules 21 and 26 can be adjusted for sensitivity and the alarm thresholed established to obtain the desired operating conditions for the particular zone.

Figure 2:
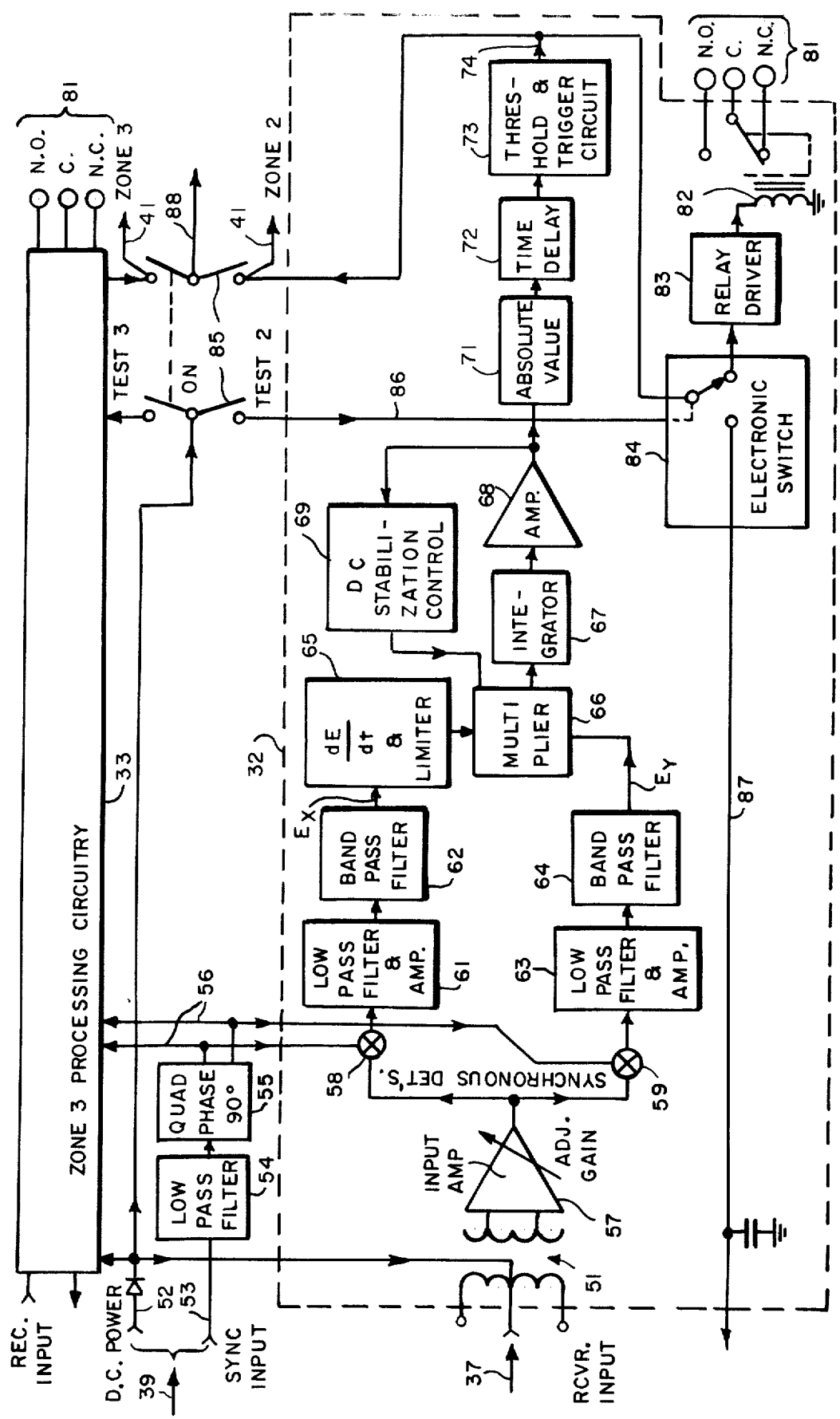
FIG. 2 is a block diagram of a dual zone module in accordance with the invention.

Referring now to FIG. 2, a dual zone module such as each of modules 21 and 26 shown in FIG. 1 will be described. The unit shown in FIG. 2 comprises the zone 2 receiver and signal processor 32 shown and described herein as a block diagram of the operating system with the corresponding unit 33 for Zone 3 designated as a single block. The units 32 and 33 have common interconnections to be presently described to make up the overall dual zone module 21 shown in FIG. 1. The details shown in unit 32 of FIG. 1 include an input signal transformer 51 to which the receiver input line 37 applies signals corresponding to ultrasonic waves received by transducers 38. The other inputs to the module of FIG. 2 constitute the power and sync signals on line 39 which provide on line 52 DC operating power and on line 53 a portion of the ultrasonic frequency signal energy generated by the transmitter oscillator in master control unit 11. This ultrasonic signal on line 53 is applied to a low pass filter 54, the output of which is applied to a phase quadrature circuit 55 to produce ultrasonic signals on lines 56 which are in 90° quadrature phase relation.

The received echo signals applied to input transformer 51 are amplified in gain adjustable amplifier 57 which permits the overall sensitivity of the zone to be set by adjusting the gain thereof. The output of amplifier 57 is applied to two synchronous detectors 58, 59 to which are also applied the respective quadrature phase signals from the lines 56.

The output signals from synchronous detectors 58 and 59 contain the Doppler signal information derived from the receiving transducers wich characteristics which permitt processing of such signals with high noise suppression as disclosed in applicant's copending application and briefly described as follows.

The output from detector 58 is applied to a low pass filter 61, the output of which is applied to a band pass filter 62 to produce an output signal $E_x$. Similarly, the detector 59 output is applied to a low pass filter 63, the output of which is applied to a band pass filter 64 to produce an output signal $E_y$. The low pass filters 61 and 63 serve to eliminate higher order beat frequencies present in the output of the detectors 58 and 59 and the band pass filters 62 and 64 are selected to correspond to the expected Coppler signal range thereby eliminating extraneous frequency components.

The signals $E_x$ and $E_y$ have the same magnitude and differ in phase by 90°. In accordance with applicant's copending application one of the signals $E_x$ is applied to a differentiator-limiter 65 having a differentiator followed by an amplitude limiting amplifier which serve, in effect, to provide a simple means for producing a frequency independent 90° phase shift at a constant amplitude for the signal $E_x$. The output of the differentiator-limiter 65 and the signal $E_y$ are applied to a multiplier 66 which thus receives signals which are either in phase or 180° out of phase depending upon the sense or direction of the target motion as being toward or away from the receiving transducer.

The output of multiplier 66 is a four-quadrant product which preserves the sign information contained in the two input factors as is the case with all true multipliers. This signal is applied to an integrator 67 followed by an amplifier 68. A DC stabilization loop is provided by a feedback circuit 69 coupled between the output of amplifier 68 and the multiplier 66 to maintain the desired output operating level.

The output of amplifier 68 is applied to an absolute value circuit 71 followed by time delay 72 and a threshold and trigger circuit 73. Thus an alarm triggering signal is provided on output lin 74 for target signals of appropriate magnitude obtained by integration which exist a sufficiently long time, such as one second, as provided by time delay 72 with the amplitude of such signals being sufficient to exceed the threshold provided by circuit 73. The general operation of the system just described and particularly the signal processing from $E_x$ and $E_y$ signals to the trigger output signal on line 74 are all described in greater detail in applicant's aforementioned copending application.

The general alarm for the detection of an intruder in any zone may be provided by connecting suitable audible or remote station monitoring equipment to a set of relay terminals 81 provided on each zone module. During normal operation while the equipment is operative a relay 82 is energized by relay driver circuit 83 which is coupled via an electronic switch 84 to output line 74. Upon the occurrence of a trigger ouput signal on line 74 the relay driver 83 deenergizes relay 82 to switch its contactts and give an alarm signal from a device connected to terminals 81. Thus the alarm device to terminals 81 will be set off if there should be a power failure causing relay 82 to be deenergized as well as upon occurence of an intrusion detection signal. This provides a fail-safe condition to indicate an alarm in the event of power failure. Terminals 81 are connected individually to provide the separate zone signals on line 40 of FIG. 1.

In addition to the general alarm actuation signal at terminals 81, the threshold trigger output signal on line 74 is coupled to provide the output on line 41 corresponding to line 41 of FIG. 1 to actuate the zone location intrusion indicator 42 for Zone 2. Similarly, the lines 41 for each of the zone processing circuits is provided for the energization of the respective zone indicators to identify the zone in which an intrusion detection signal has been received. Thus in addition to providing the general alarm, as achieved from the indicators connected to the respective output terminals 81, the individual zone indications on indicators 42–45 are achieved from the detection signals appearing at the respective output lines 41 for each of the zone modules.

In addition to the foregoing operating circuits a zone test circuit is provided by means of a doupble-pole double-throw rocker switch 85 for each pair of zones. The switch 85 has an open circuit center position for normal non-test operation. Thus for testing the operability of Zone 2 the switch 85 is manually actuated to connect the DC output line 52 to line 86 which actuates electronic switch 84 to switch the output line 74 to cause the relay driver 83 to deenergize the relay 82. Under test conditions the normal alarm indication can be suppressed at the master control station. However, an audible or visible test signal indicator is coupled to a line 88 which, for the test condition of switch 85, is connected to the output signal on line 74 to be actuated thereby.

The switch 84, for test condition, also places DC power on line 87 which may conveniently be the shield braid of receiver lines 37. A simple test circuit can be connected to line 87 at any location and be energized therefrom in test condition to provide local indication of alarm test signals occurring on line 74.

The operation of the invention will be clear from the foregoing description. By means of the invention additional and complex zone subdivision of the overall areas under surveillance and protection can be arranged with provision for flexibility and adding additional zones as required without the expense of adding completely independent systems as additional zones are brought into the system. Furthermore, by operating all of the zones from a common transmitter source, reliability and ease of maintenance are achieved as well as reliability improvement respecting the maintenance of the desired thresholds and area coverage within zones. In addition, interference between multiple units is avoided. Accordingly, the invention will be understood to provide improved operating characteristics not heretofore available and at the same time reduce both the initial and maintenance cost thereof. These features and advantages of the invention can be achieved with modifications of the apparatus shown and with different type detectors and, accordingly, the invention is not to be considered as limited to the specific circuits and signal processing systems disclosed but only by the scope of the appended claims.

I claim:

1. A multiple zone ultrasonic intrusion detection system comprising:
    a master oscillator for generating power at ultrasonic frequency;
    first transmitting transducer means energized by said master oscillator for radiating ultrasonic wave energy into a first zone;
    first receiving transducer means for receiving ultrasonic wave energy from said first zone and converting received waves into electric signals;
    second transmitting transducer means energized by said master oscillator for radiating ultrasonic waves into a second zone;
    second receiving transducer means for receiving ultrasonic waves from said second zones and converting received waves into electric signals;
    means for processing said electric signals from said first and second receiving transducer means to recover separate Doppler shifted components arising from moving objects within the respective zones; and
    means responsive to said Doppler shifted components of predetermined magnitude for selectively indicating at a central location which of said zones contains a moving object.

2. A multiple zone ultrasonic intrusion detection system comprising:
    ultrasonic transceiver means including an ultrasonic generator and transducers for transmitting and receiving ultrasonic waves within a first zone and detector means for detecting Doppler shifted components during the presence of one or more moving objects in said first zone;
    means for transmitting ultrasonic waves derived from said generator in said transceiver means into one or more additional zones;
    separate receiver transducer means in each of said additional zones including detector means for detecting Doppler shifted components during the presence of a moving object in the respective additional zones; and
    alarm means at a central location coupled to respond respectively to said Doppler shifted components in each of said zones for identifying each zone in which a moving object is located.

3. A multiple zone ultrasonic intrusion detection system comprising:
    an ultrasonic wave transmitter having a master oscillator coupled to transducer means for propagating ultrasonic waves into a plurality of separate zones;
    receiving means for each of said zones coupled to said master oscillator and responsive to said ultrasonic waves propagated and reflected in each respective zone for producing separate Doppler shifted signal components corresponding to moving objects in the respective zones; and indicator means at a central location responsive to said Doppler shifted components greater than a predetermined threshold for selectively indicating each zone in which a moving object is located.

4. Apparatus accordingly to claim 3 in which said system is adapted for multiple additional zones by providing:

additional transmitting transducer means for each additional zone;

means coupling said additional transmitting transducer means to said master oscillator for propagating ultrasonic energy in each said additional zone;

individual additional said receiving means for each said additional zone; and said indicator means including individual additional indicators at said central location for each said additional zone.

5. A receiver-signal processor module for multi-zone system expansion of an ultrasonic intruder detection system having receiving transducers located in each protected zone, a source of transmitter ultrasonic energy with means for radiating said transmitter energy in each protected zone, and central alarm means, comprising:

receiver input terminals adapted for coupling to said receiving transducers located in a particular zone associated with said module;

transmitter frequency reference input terminals adapted for coupling to said source of transmitter ultrasonic energy for said multi-zone system;

signal processing circuits operable in response to signals on said receiver input terminals and said transmitter frequency reference input terminals for detecting Doppler signal components resulting from moving objects in said particular zone;

means for producing a signal actuation in response to said Doppler signals corresponding to the presence of a moving intruder in said particular zone; and a circuit for actuating said central alarm means in response to said signal actuation to indicate the zone in which said moving intruder is located.

* * * * *